United States Patent [19]

Scheerer

[11] 4,101,228
[45] Jul. 18, 1978

[54] HOUSING FOR A FLEXIBLE COUPLING

[75] Inventor: Wolfgang Scheerer, Meerbusch, of Germany

[73] Assignee: A. Ehrenreich GmbH & Co. KG., Düsseldorf, Germany

[21] Appl. No.: 818,613

[22] Filed: Jul. 25, 1977

[30] Foreign Application Priority Data

Aug. 4, 1976 [DE] Fed. Rep. of Germany ....... 2634938

[51] Int. Cl.² ............................................. F16C 11/00
[52] U.S. Cl. ..................................... 403/137; 403/143
[58] Field of Search ............... 403/135, 137, 140, 143, 403/133, 122; 308/71

[56] References Cited

U.S. PATENT DOCUMENTS

| | | | |
|---|---|---|---|
| 1,612,047 | 12/1926 | Owens | 403/143 X |
| 3,004,786 | 10/1961 | Herbenar | 403/140 |
| 3,309,117 | 3/1967 | Gottschald | 403/135 |
| 3,366,356 | 1/1968 | Fisher | 308/71 UX |
| 3,448,957 | 6/1969 | Friedman | 403/143 X |
| 3,762,240 | 10/1973 | Adams | 308/71 X |
| 3,787,129 | 1/1974 | Kohler | 403/135 |

FOREIGN PATENT DOCUMENTS

604,501 1/1926 France ................................. 403/143

*Primary Examiner*—Wayne L. Shedd
*Attorney, Agent, or Firm*—Ernest F. Marmorek

[57] ABSTRACT

In a coupling including a ball, a hollow housing, and a slit which extends in correspondence with preselected longitudinal lines on the ball within a predetermined region of the hollow housing so that a series of resiliently movable tongues are provided between the slits. The housing and its tongues are adapted to surround the ball and to resiliently engage portions of the ball respectively, so that a general axial pressure exerted on the housing varies the intensity of engagement of the ball portions by the tongues.

10 Claims, 3 Drawing Figures

HOUSING FOR A FLEXIBLE COUPLING

BACKGROUND OF THE INVENTION

The present invention relates particularly to a housing for a flexible coupling. Such a housing, for accommodating a gear shift lever in automobiles, conventionally consists of two parts of sheet metal. Housings of sheet metal have also been proposed for this application. Such a housing is usually installed at the chassis floor level, and serves to support the gear shift lever and its downward extension from the shaft. A difficulty, which has been encountered in manufacturing such a gear-shift lever housing, is due to the fact that in most cases very large deviations of the gear-shift lever are required. This in turn requires that a wide opening be formed in the housing, which is in conflict with the requirement for accommodating a large force in an axial direction. Since in addition it is necessary to insert a ball into the housing, a two-part housing is therefore required.

It is an object of the present invention to devise a simple housing of synthetic plastic material, into which a ball may easily be inserted without there occurring any play between the ball and the housing. The term "simple housing" is understood to include a housing which can be fabricated as a two-part injection molding. If the housing is, for example, formed with slits in a longitudinal direction for the installation of a ball end pin, and is formed with a transverse bore for receiving a screw or the like for attaching the housing to the chassis, then such a housing requires very complicated and multiply split molds, as well as expensive injection molding machines. Since housings for the gear-shift lever, according to the present invention, are, however, primarily used for trucks and buses, and are thus manufactured in relatively small quantities, the cost of the mold can therefore appreciably influence the price of the final product.

SUMMARY OF THE INVENTION

One of the objects of the present invention is therefore attained by providing a housing for use in connection with a flexible, substantially spherically-shaped coupling having a ball, particularly for a gear-shaped lever in automobiles, including in combination a hollow, generally spherically-shaped casing body adapted to engage the ball and having a central axis, a plurality of slits extending in a direction corresponding to longitudinal lines of a globe within a predetermined region of the casing body, and including an external portion in the shape of a truncated cone within the region of the slits; the housing additionally includes a frame connected to the casing and a cup-shaped body surrounding the cone-shaped portion of the casing body which is axially adjustable with respect to the casing body. When a generally axial pressure is exerted between the bodies, the extent of engagement between the casing body and the ball is adjusted.

It is preferable if the cup-shaped body is composed of synthetic plastic material and forms part of the chassis of an automobile. It is also advantageous if the casing body is integrally connected to the frame, and if the flange includes a peripheral flange extending from the frame at an angle to the axis.

The housing preferably includes fasteners for attaching the cup-shaped body to the frame, and at least one spacer disposed between the cup-shaped body and the frame to provide a predetermined distance between the bodies.

In a preferred version, the coupling includes a ball and a hollow housing which has slits which extend in correspondence with preselected longitudinal lines on a globe within a predetermined region of the hollow housing so as to provide between the slits a series of resiliently movable tongues; the housing and its tongues are adapted to surround the ball and to resiliently engage portions of the ball, respectively and means are provided which are operable for respectively increasing and decreasing the intensity of engagement of the ball portions by the tongues.

The housing preferably includes a ball-receiving part, and a part surrounding the ball-receiving part, and the ball-engagement means includes fastening means for attaching the parts to one another to provide a predetermined distance between the parts. The parts are preferably formed with respective pairs of flanges, and each of the flange pairs has respective openings which may be aligned with one another; the fastening means preferably include at least a pair of bolts which may pass through the aligned openings, and a pair of nuts which may be screwed to the bolts, respectively.

The ball engagement means preferably also include a pair of spacers which have respective holes and may be inserted between the parts for the spacer holes to be aligned with the flange openings, respectively.

Brief Description of the Drawing

For a fuller understanding of the nature and objects of the invention, reference should be had to the following detailed description, taken in connection with the accompanying drawings in which.

DESCRIPTION OF THE PREFERRED EMBODIMENTS

Figure 1:
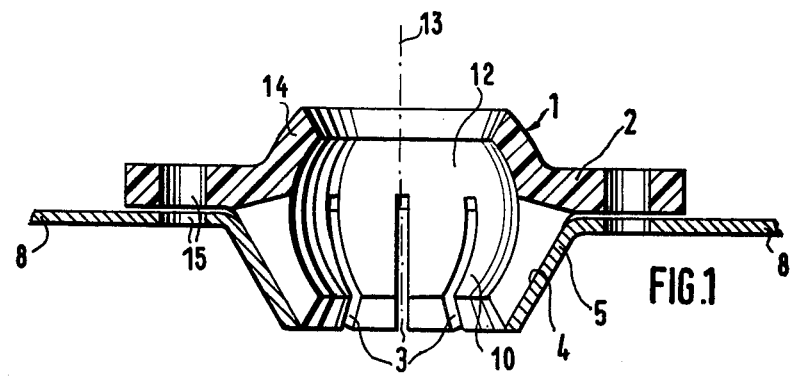
FIG. 1 shows a housing having a conically shaped ring of sheet metal.
Figure 2:
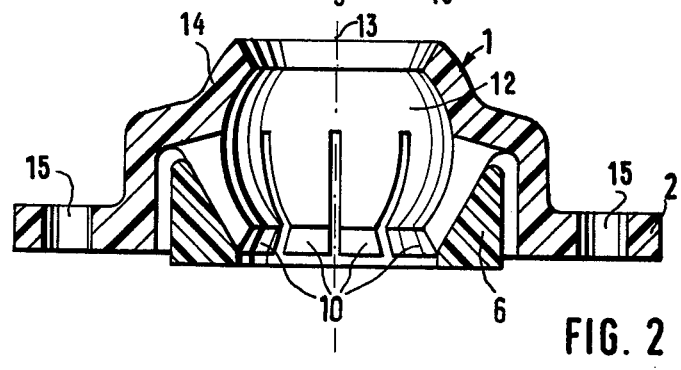
FIG. 2 shows a housing having a flange bent at right angles, and a conically shaped ring made of synthetic material.
Figure 3:
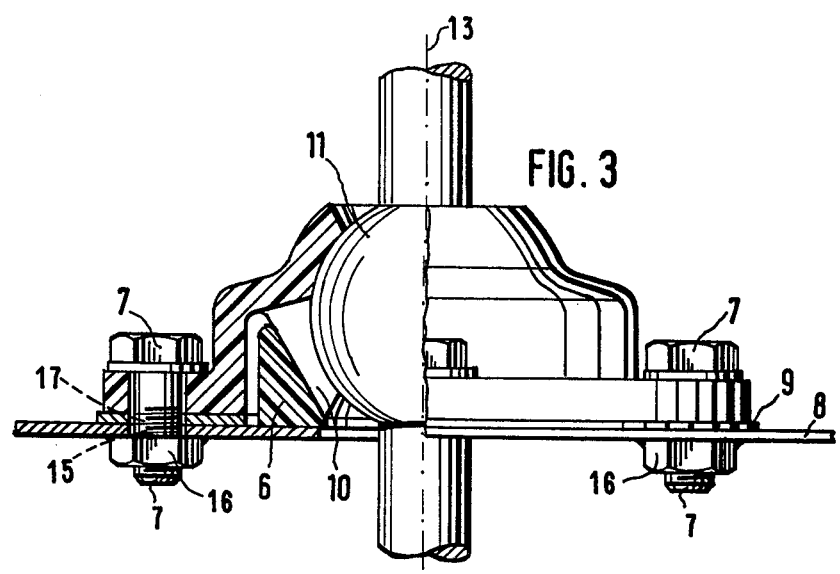
FIG. 3 shows a housing according to FIG. 2, but with a coupling inserted therein.

In carrying the invention into effect, it will be seen, particularly referring to FIG. 1, that a housing 1 for use in connection with a flexible, substantially spherically-shaped coupling having a ball 11, best seen in FIG. 3, particularly for a gear-shaped lever in automobiles, includes in combination a hollow, generally spherically-shaped casing body 12 which is adapted to engage the ball 11. The casing body 12 has a central axis 13 and a plurality of slits 3, which extend in a direction corresponding to longitudinal lines of a globe within a predetermined region of the casing body 12. An external portion 4 of the casing body 12 has the shape of a truncated cone, and is disposed within the region of the slits 3; a frame 14 is connected to the casing body 12, and a cup-shaped body 6 surrounds the cone-shaped portion 4 of the casing body 12, and may be adjusted axially with respect to the casing body 12. When a generally axial pressure is exerted between the casing body 12 and the cup-shaped body 6, the extent of engagement between the casing body 12 and the ball 11 is adjusted.

The cup-shaped body 6 is composed of synthetic plastic material, and the construction is particularly simple if the cup-shaped body 6 forms part of a chassis of the automobile.

The manufacture of the housing is particularly simplified if the casing body 12 is integrally connected to the frame 14. The frame 14 includes a peripheral flange 2 which extends therefrom at an angle to the axis 13; this angle is usually 90°.

The housing 1 additionally includes fastening means for attaching the cup-shaped body to the frame 14, and at least one spacer 9 disposed between the cup-shaped body 6 and the frame 14 to provide a predetermined distance between the cup-shaped body 6 and the casing body 12.

Referring particularly to FIG. 3, it will be seen that the fastening means include bolts 7 passing through openings 15 in flanges 2 and 8, respectively, nuts 16 which can be screwed onto respective bolts 16, and spacers 9 formed with respective holes 17, which are interposed between the flanges 2 and 8 to provide a predetermined distance between the flanges. The bolts 7 with the corresponding nuts 16, the flanges 2 and 8, and the tongues 10, can therefore be described as engagement means for respectively increasing and decreasing the intensity of engagement of the selected portions of the ball 11 by the tongues 10.

Having thus described, the invention, what I claim as new and desired to be secured by Letters Patent, is as follows:

1. A housing for use in connection with a flexible, substantially spherically-shaped coupling having a ball, particularly for a gear-shift lever in automobiles, comprising in combination:
    a hollow, generally spherically-shaped casing body adapted to engage the ball and having a central axis, a plurality of slits extending in a direction corresponding to longitudinal lines of a globe within a predetermined region of said casing body, and including an external portion in the shape of a truncated cone within the region of said slits,
    a frame connected to said casing body, and
    a cup-shaped body surrounding the cone-shaped portion of said casing body and being axially adjustable with respect to said casing body, whereby when a generally axial pressure is exerted between said bodies, the extent of engagement between said casing body and the ball is adjusted.

2. A housing as claimed in claim 1, wherein said cup-shaped body is composed of synthetic plastic material.

3. A housing as claimed in claim 1, wherein said cup-shaped body forms part of the chassis of an automobile.

4. A housing as claimed in claim 1, wherein said casing body is integrally connected to said frame.

5. A housing as claimed in claim 1, wherein said frame includes a peripheral flange extending from said frame at an angle to said axis.

6. A housing as claimed in claim 5, further comprising fastening means for attaching said cup-shaped body to said frame, and at least one spacer disposed between said cup-shaped body and said frame to provide a predetermined distance between said bodies.

7. In a coupling including a ball,
    comprising in combination:
    a hollow housing having slits extending in correspondence with preselected longitudinal lines on a globe within a predetermined region of said hollow housing thereby providing between the slits a series of resiliently movable tongues, said housing and the tongues thereof being adapted to surround the ball and to resiliently engage portions of the ball, respectively, and
    means operable for respectively increasing and decreasing the intensity of engagement of the ball portions by said tongues.

8. In a coupling according to claim 7, wherein said housing includes a ball-receiving part, and a portion surrounding said ball-receiving part, and wherein the ball-engagement means include fastening means for attaching said parts to one another to provide a predetermined distance therebetween.

9. In a coupling according to claim 7, wherein said parts are formed with respective pairs of flanges, each of the flange pairs having respective flange openings alignable with one another, and wherein said fastening means includes at least a pair of bolts passable through the aligned openings, and a pair of nuts screwable to the bolts, respectively.

10. In a coupling according to claim 9, wherein the ball-engagement means include a pair of spacers having respective holes and insertable between said parts for the spacer holes to be aligned with the flange openings, respectively.

* * * * *